(12) United States Patent
De et al.

(10) Patent No.: US 7,768,986 B2
(45) Date of Patent: *Aug. 3, 2010

(54) METHOD AND APPARATUS FOR RECEIVING PLURALITY OF DATA SIGNALS

(75) Inventors: Parthapratim De, Campbell, CA (US); Ariela Zeira, Huntington, NY (US); Jung-Lin Pan, Selden, NY (US); Raj Mani Misra, Fremont, CA (US)

(73) Assignee: InterDigital Technology Corporation, Wilmington, DE (US)

( * ) Notice: Subject to any disclaimer, the term of this patent is extended or adjusted under 35 U.S.C. 154(b) by 0 days.

This patent is subject to a terminal disclaimer.

(21) Appl. No.: 12/185,878

(22) Filed: Aug. 5, 2008

(65) Prior Publication Data

US 2008/0317103 A1 Dec. 25, 2008

Related U.S. Application Data

(63) Continuation of application No. 11/530,919, filed on Sep. 12, 2006, now Pat. No. 7,414,999, which is a continuation of application No. 10/052,943, filed on Nov. 7, 2001, now Pat. No. 7,110,383.

(60) Provisional application No. 60/246,947, filed on Nov. 9, 2000.

(51) Int. Cl.
*H04B 7/216* (2006.01)
(52) U.S. Cl. ..................................... 370/342
(58) Field of Classification Search ........................ None
See application file for complete search history.

(56) References Cited

U.S. PATENT DOCUMENTS 5,157,668 A 10/1992 Buenzli et al.

5,377,225 A 12/1994 Davis
5,377,226 A 12/1994 Davis (Continued)

FOREIGN PATENT DOCUMENTS

WO 99/12374 3/1999

(Continued)

OTHER PUBLICATIONS

3rd Generation Partnership Project, 3GPP TS 25.102 V3.4.0, Oct. 2000 (Release 1999), "*UTRA (TDD) Radio Transmission and Reception*", Technical Specification Group RAN WG4, Annex B, pp. 37. (3rd Generation Partnership Project, 1999).

(Continued)

*Primary Examiner*—Robert W Wilson
(74) *Attorney, Agent, or Firm*—Volpe and Koenig, P.C.

(57) ABSTRACT

A transmitter site transmits a plurality of different data signals at a chip rate over a shared spectrum in a code division multiple access communication system. Each transmitted data signal experiences a similar channel response. A combined signal of the transmitted data signals is received. The combined signal is sampled at a multiple of the chip rate. The channel response for the combined signal is determined. A spread data vector is determined using the combined signal samples and the estimated channel response. The data of the different data signals is determined using the spread data vector.

18 Claims, 8 Drawing Sheets

U.S. PATENT DOCUMENTS

| | | | |
|---|---|---|---|
| 5,477,225 | A | 12/1995 | Young et al. |
| 5,648,983 | A | 7/1997 | Kostic et al. |
| 6,064,689 | A | 5/2000 | Vollmer et al. |
| 6,175,588 | B1 | 1/2001 | Visotsky et al. |
| 6,615,044 | B2 | 9/2003 | Tigerstedt et al. |
| 6,856,643 | B1 | 2/2005 | Yang et al. |
| 7,072,290 | B2 * | 7/2006 | De et al. ............... 370/210 |
| 7,106,719 | B2 * | 9/2006 | De et al. ............... 370/342 |
| 7,110,383 | B2 * | 9/2006 | De et al. ............... 370/342 |
| 7,110,384 | B2 * | 9/2006 | De et al. ............... 370/342 |
| 7,110,385 | B2 * | 9/2006 | De et al. ............... 370/342 |
| 7,126,961 | B2 * | 10/2006 | De et al. ............... 370/442 |
| 7,126,962 | B2 * | 10/2006 | De et al. ............... 370/442 |
| 7,126,978 | B2 * | 10/2006 | De et al. ............... 370/442 |
| 7,133,394 | B2 * | 11/2006 | De et al. ............... 370/342 |
| 7,133,412 | B2 * | 11/2006 | De et al. ............... 370/442 |
| 7,414,999 | B2 * | 8/2008 | De et al. ............... 370/342 |
| 2002/0126619 | A1 | 9/2002 | De et al. |
| 2002/0126646 | A1 | 9/2002 | De et al. |
| 2002/0131383 | A1 | 9/2002 | De et al. |
| 2002/0136160 | A1 | 9/2002 | De et al. |
| 2002/0141366 | A1 | 10/2002 | De et al. |
| 2002/0141372 | A1 | 10/2002 | De et al. |
| 2002/0141373 | A1 | 10/2002 | De et al. |
| 2002/0145989 | A1 | 10/2002 | De et al. |
| 2002/0154599 | A1 | 10/2002 | De et al. |
| 2002/0154619 | A1 | 10/2002 | De et al. |
| 2002/0159383 | A1 | 10/2002 | De et al. |
| 2002/0159428 | A1 | 10/2002 | De et al. |

FOREIGN PATENT DOCUMENTS

| | | |
|---|---|---|
| WO | 99/20061 | 4/1999 |
| WO | 01/20801 | 3/2001 |

OTHER PUBLICATIONS

Benvenuto et al., "Joint Detection With Low Computational Complexity for Hybrid TD-CDMA Systems" VTC 1999-Fall. IEEE VTS 50th. Vehicular Technology Conference. Gateway to the 21st Century Communications Village, Amsterdam, IEEE Vehicular Technology Conference, NY (Sep. 19-22, 1999).

ETSI STC SMG2 Layer 1 Expert Group, "Low Cost MMSE-BLE-SD Algorithm for UTRA TDD Mode Downline", Tdoc SMG2 UMTS L1, (ETSI, Helsinki, Finland, Sep. 1998).

Horlin et al., "CA-CDMA: Channel adapted CDMA for MAI/ISI free burst transmission," Communications and Vehicular Technology, pp. 186-193 (Oct. 19, 2000).

Karimi et al., "A Novel and Efficient Solution to Block-Based Joint-Detection using Approximate Cholesky Factorization", *Proceedings of the Ninth IEEE International Symposium on Personal, Indoor and Mobile Radio Communications (PIMRC' 98)*, IEEE Conference Proceedings, vol. 3, pp. 1340-1345, (Sep. 1998).

Klein et al., "Zero Forcing and Minimum Mean-Square Error Equalization for Multi-user Detection in Code-Division Multiple-Access Channels", *IEEE Trans. on Vehicular Technology*, vol. 45, No. 2, pp. 276-287, (IEEE, May 1996).

Klein, "Data Detection Algorithms Specially Designed for the Downlink of CDMA Mobile Radio Systems", *IEEE 47th Vehicular Technology Conference*, pp. 203-207, (May 1997).

Pados et al., "Auxiliary-Vector Filters and Adaptive Steering for DS/CDMA Single-User Detection," IEEE Transactions on Vehicular Technology, vol. 48, No. 6, pp. 1831-1839 (Nov. 1999).

Pigeonnat, "Alternative Solutions for Joint Detection in TD/CDMA Multiple Access Scheme for UMTS", IEEE Signal Processing Workshop on Signal Processing Advances in Wireless Communications, pp. 329-332, p. 329, para. 2., (May 1999).

Pigeonnat, "Joint Detection for UMTS: Complexity and Alternative Solutions," Proceedings of the 1999 IEEE 49$^{th}$ Vehicular Technology Conference, IEEE, vol. 1, pp. 546-550, IEEE, (May 1999).

Prasad et al., *Third Generation Mobile Communication Systems*, Artech House, Boston, (2000).

Proakis et al., *Digital Signal Processing*, p. 835, para. 11.3.1, p. 890, para. 12.3.2, Macmillan Publishing Company, (New York, NY, 1992).

Tong et al., "Blind identification and equalization based on second-order statistics: a time domain approach", IEEE Trans. Inf. Theory (USA), *IEEE Transactions on Information Theory*, , ISSN 0018-9448, vol. 40, No. 2, pp. 340-349 (Mar. 1994).

Vandaele et al., Recursive Total Least Squares Algorithm for Single-User Blind Channel Equalization: IEE Proceedings: Vision, Image and Signal Processing, Institution of Electrical Engineers, FB, vol. 147, No. 3, (Jun. 23, 2000).

Vollmer et al., "Joint-Detection Using Fast Fourier Transforms in TD-CDMA Based Mobile Radio Systems", International Annual Conference of ICT, pp. 1-7, p. 1, para. 1, p. 2, para. II, p. 3, para. III, p. 4, para. IV. (1999).

Yang et al., "Fast Joint Detection with Cyclic Reduction Exploiting Displacement Structures", 2000 IEEE International Conference on Acoustics, Speech and Signal Processing, vol. 5, pp. 2857-2860, (Istanbul, Turkey, Jun. 2000).

* cited by examiner

US 7,768,986 B2

METHOD AND APPARATUS FOR RECEIVING PLURALITY OF DATA SIGNALS

CROSS REFERENCE TO RELATED APPLICATIONS

This application is a continuation of U.S. patent application Ser. No. 11/530,919, filed on Sep. 12, 2006, which is a continuation of U.S. patent application Ser. No. 10/052,943, filed on Nov. 7, 2001, now U.S. Pat. No. 7,110,383, which claims priority to U.S. Provisional Patent Application No. 60/246,947, filed on Nov. 9, 2000, which applications are incorporated herein by reference.

BACKGROUND

The invention generally relates to wireless communication systems. In particular, the invention relates to data detection in a wireless communication system.

FIG. 1 is an illustration of a wireless communication system 10. The communication system 10 has base stations $12_1$ to $12_5$ (12) which communicate with user equipments (UEs) $14_1$ to $14_3$ (14). Each base station 12 has an associated operational area, where it communicates with UEs 14 in its operational area.

In some communication systems, such as code division multiple access (CDMA) and time division duplex using code division multiple access (TDD/CDMA), multiple communications are sent over the same frequency spectrum. These communications are differentiated by their channelization codes. To more efficiently use the frequency spectrum, TDD/CDMA communication systems use repeating frames divided into time slots for communication. A communication sent in such a system will have one or multiple associated codes and time slots assigned to it. The use of one code in one time slot is referred to as a resource unit.

Since multiple communications may be sent in the same frequency spectrum and at the same time, a receiver in such a system must distinguish between the multiple communications. One approach to detecting such signals is multiuser detection. In multiuser detection, signals associated with all the UEs 14, users, are detected simultaneously. Approaches for implementing multiuser detection include block linear equalization based joint detection (BLE-JD) using a Cholesky or an approximate Cholesky decomposition. These approaches have a high complexity. The high complexity leads to increased power consumption, which at the UE $14_1$ results in reduced battery life. Accordingly, it is desirable to have alternate approaches to detecting received data.

SUMMARY

A code division multiple access user equipment is used in receiving a plurality of data signals over a shared spectrum. Each received data signal experiences a similar channel response. A combined signal of the received data signals is received over the shared spectrum. The combined signal is sampled at a multiple of the chip rate. A channel response is estimated as a channel response matrix at the multiple of the chip rate. A padded version of a spread data vector of a size corresponding to the multiple chip rate using a column of the channel response matrix, the estimated channel response matrix, the samples and a fourier transform. The spread data vector is estimated by eliminating elements of the padded version so that the estimated spread data vector is of a size corresponding to the chip rate.

BRIEF DESCRIPTION OF THE DRAWING(S)

DETAILED DESCRIPTION OF THE PREFERRED EMBODIMENT(S)

Figure 2:
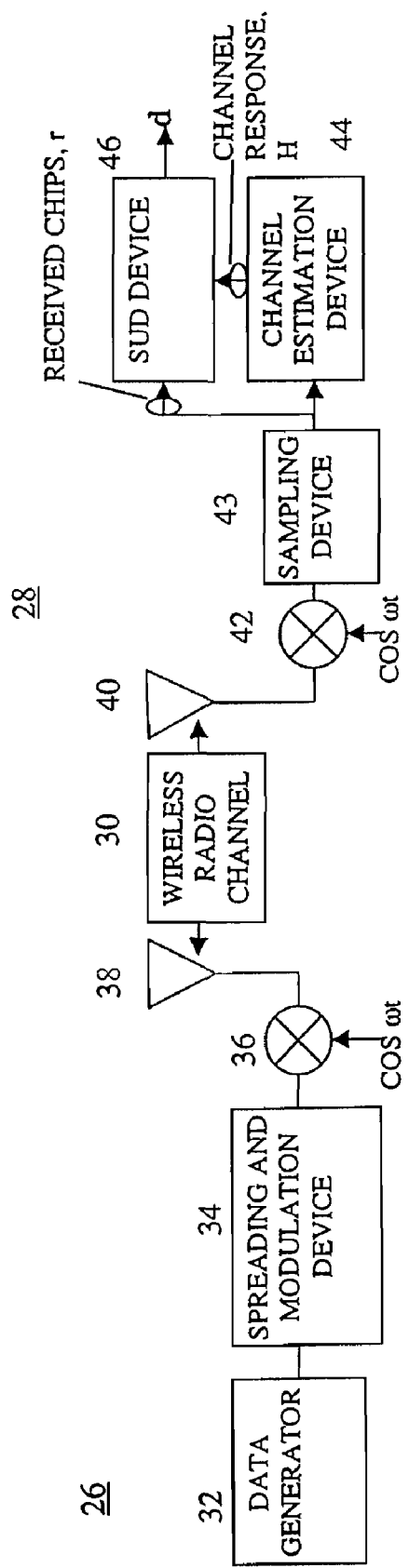
FIG. 2 is a simplified transmitter and a single user detection receiver.

FIG. 2 illustrates a simplified transmitter 26 and receiver 28 using single user detection (SUD) in a TDD/CDMA communication system, although the single user detection approaches are applicable to other systems, such as frequency division duplex (FDD) CDMA. In a typical system, a transmitter 26 is in each UE 14 and multiple transmitting circuits 26 sending multiple communications are in each base station 12. The SUD receiver 28 may be at a base station 12, UEs 14 or both. SUD is typically used to detect data in a single or multicode transmission from a particular transmitter. When all the signals are sent from the same transmitter, each of the individual channel code signals in the multicode transmission experience the same channel impulse response. SUD is particularly useful in the downlink, where all transmissions originate from a base station antenna or antenna array. It is also useful in the uplink, where a single user monopolizes a timeslot with a single code or multicode transmission.

The transmitter 26 sends data over a wireless radio channel 30. A data generator 32 in the transmitter 26 generates data to be communicated to the receiver 28. A modulation/spreading sequence insertion device 34 spreads the data and makes the spread reference data time-multiplexed with a midamble training sequence in the appropriate assigned time slot and codes for spreading the data, producing a communication burst or bursts.

Figure 1:
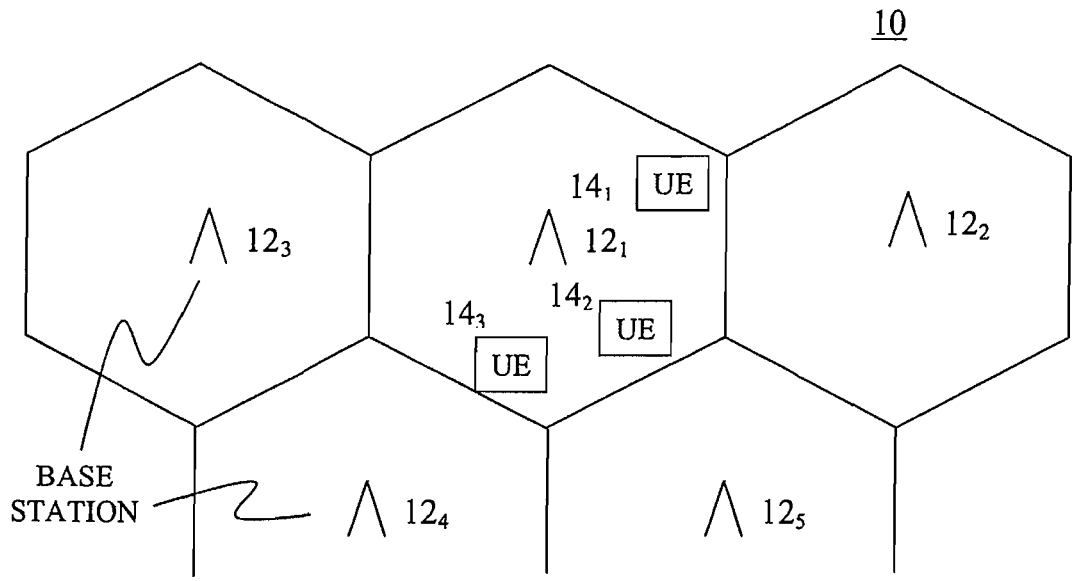
FIG. 1 is a wireless communication system.
Figure 3:
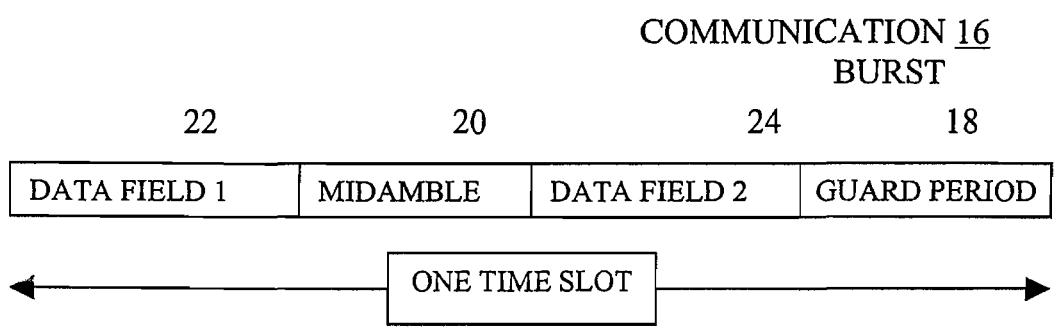
FIG. 3 is an illustration of a communication burst.

A typical communication burst 16 has a midamble 20, a guard period 18 and two data bursts 22, 24, as shown in FIG. 3. The midamble 20 separates the two data fields 22, 24 and the guard period 18 separates the communication bursts to allow for the difference in arrival times of bursts transmitted from different transmitters 26. The two data bursts 22, 24 contain the communication burst's data.

The communication burst(s) are modulated by a modulator 36 to radio frequency (RF). An antenna 38 radiates the RF signal through the wireless radio channel 30 to an antenna 40 of the receiver 28. The type of modulation used for the transmitted communication can be any of those known to those skilled in the art, such as quadrature phase shift keying (QPSK) or M-ary quadrature amplitude modulation (QAM).

The antenna 40 of the receiver 28 receives various radio frequency signals. The received signals are demodulated by a demodulator 42 to produce a baseband signal. The baseband signal is sampled by a sampling device 43, such as one or multiple analog to digital converters, at the chip rate or a multiple of the chip rate of the transmitted bursts. The samples are processed, such as by a channel estimation device 44 and a SUD device 46, in the time slot and with the appropriate codes assigned to the received bursts. The channel estimation device 44 uses the midamble training sequence component in the baseband samples to provide channel information, such as channel impulse responses. The channel impulse responses can be viewed as a matrix, H. The channel information is used by the SUD device 46 to estimate the transmitted data of the received communication bursts as soft symbols.

The SUD device 46 uses the channel information provided by the channel estimation device 44 and the known spreading codes used by the transmitter 26 to estimate the data of the desired received communication burst(s). Although SUD is explained using the third generation partnership project (3GPP) universal terrestrial radio access (UTRA) TDD system as the underlying communication system, it is applicable to other systems. That system is a direct sequence wideband CDMA (W-CDMA) system, where the uplink and downlink transmissions are confined to mutually exclusive time slots.

The receiver 28 receives using its antenna 40 a total of K bursts that arrive simultaneously, 48. The K bursts are superimposed on top of each other in one observation interval. For the 3GPP UTRA TDD system, each data field of a time slot corresponds to one observation interval.

For one observation interval, the data detection problem is viewed as per Equation 1.

$$r = H \cdot d + n \qquad \text{Equation 1}$$

r is the received samples. H is the channel response matrix. d is the spread data vector. The spread data matrix contains the data transmitted in each channel mixed with that channel's spreading code.

When the received signal is oversampled, multiple samples of each transmitted chip are produced resulting in received vectors, $r_1, \ldots, r_N$, (48). Similarly, the channel estimation device 44 determines the channel responses, $H_1, \ldots, H_N$, corresponding to the received vectors, $r_1, \ldots, r_N$, (50). For twice the chip rate, Equation 1 becomes Equation 2.

$$\begin{bmatrix} r_1 \\ r_2 \end{bmatrix} = \begin{bmatrix} H_1 \\ H_2 \end{bmatrix} \cdot d + n \qquad \text{Equation 2}$$

$r_1$ is the even samples (at the chip rate) and $r_2$ is the odd samples (offset half a chip from the $r_1$ samples). $H_1$ is the channel response for the even samples and $H_2$ is the channel response for the odd samples.

Equation 1 becomes Equation 3 for a multiple N of the chip rate.

$$\begin{bmatrix} r_1 \\ r_2 \\ \vdots \\ r_N \end{bmatrix} = \begin{bmatrix} H_1 \\ H_2 \\ \vdots \\ H_N \end{bmatrix} \cdot d + n \qquad \text{Equation 3}$$

$r_1, r_2 \ldots r_N$ are the multiple of the chip rate samples. Each offset by 1/N of a chip. $H_1, H_2 \ldots H_N$ are the corresponding channel responses. Although the following discussion focuses on a receiver sampling at twice the chip rate, the same approaches are applicable to any multiple of the chip rate.

For twice the chip rate sampling, matrices $H_1$ and $H_2$ are $(N_S+W-1)$ by $N_S$ in size. $N_S$ is the number of spread chips transmitted in the observation interval and W is the length of the channel impulse response, such as 57 chips in length. Since the received signal has $N_S$ spread chips, the length of $r_1$ and $r_2$ is $N_S$. Equation 2 is rewritten as Equation 4.

$$\begin{bmatrix} r_1(0) \\ r_1(1) \\ | \\ r_1(W-1) \\ | \\ r_1(N_S-1) \\ \ldots \\ r_2(0) \\ r_2(1) \\ | \\ r_2(W-1) \\ | \\ r_2(N_S-1) \end{bmatrix} = \begin{bmatrix} h_1(0) & 0 & 0 & \ldots & \ldots & \ldots & \ldots & \ldots \\ h_1(1) & h_1(0) & 0 & \ldots & & & & \\ | & | & & & & & & \\ h_1(W-1) & h_1(W-2) & \ldots & \ldots & h_1(1) & h_1(0) & 0 & 0 \\ | & | & & & | & | & | & | \\ 0 & 0 & \ldots & h_1(W-1) & h_1(W-2) & \ldots & h_1(1) & h_1(0) \\ \ldots & \ldots & \ldots & \ldots & \ldots & \ldots & \ldots & \ldots \\ h_2(0) & 0 & 0 & \ldots & \ldots & \ldots & \ldots & \ldots \\ h_2(1) & h_2(0) & 0 & \ldots & & & & \\ | & | & & & & & & \\ h_2(W-1) & h_2(W-2) & \ldots & \ldots & h_2(1) & h_2(0) & 0 & 0 \\ | & | & & & | & | & | & | \\ 0 & 0 & \ldots & h_2(W-1) & h_2(W-2) & \ldots & h_2(1) & h_2(0) \\ \ldots & \ldots & \ldots & \ldots & \ldots & \ldots & \ldots & \ldots \end{bmatrix} \cdot d + n \qquad \text{Equation 4}$$

$r_1(i)$, $r_2(i)$, $h_1(i)$ and $h_2(i)$ is the $i^{th}$ element of the corresponding vector matrix $r_1$, $r_2$, $H_1$ and $H_2$, respectively.

Figure 4:
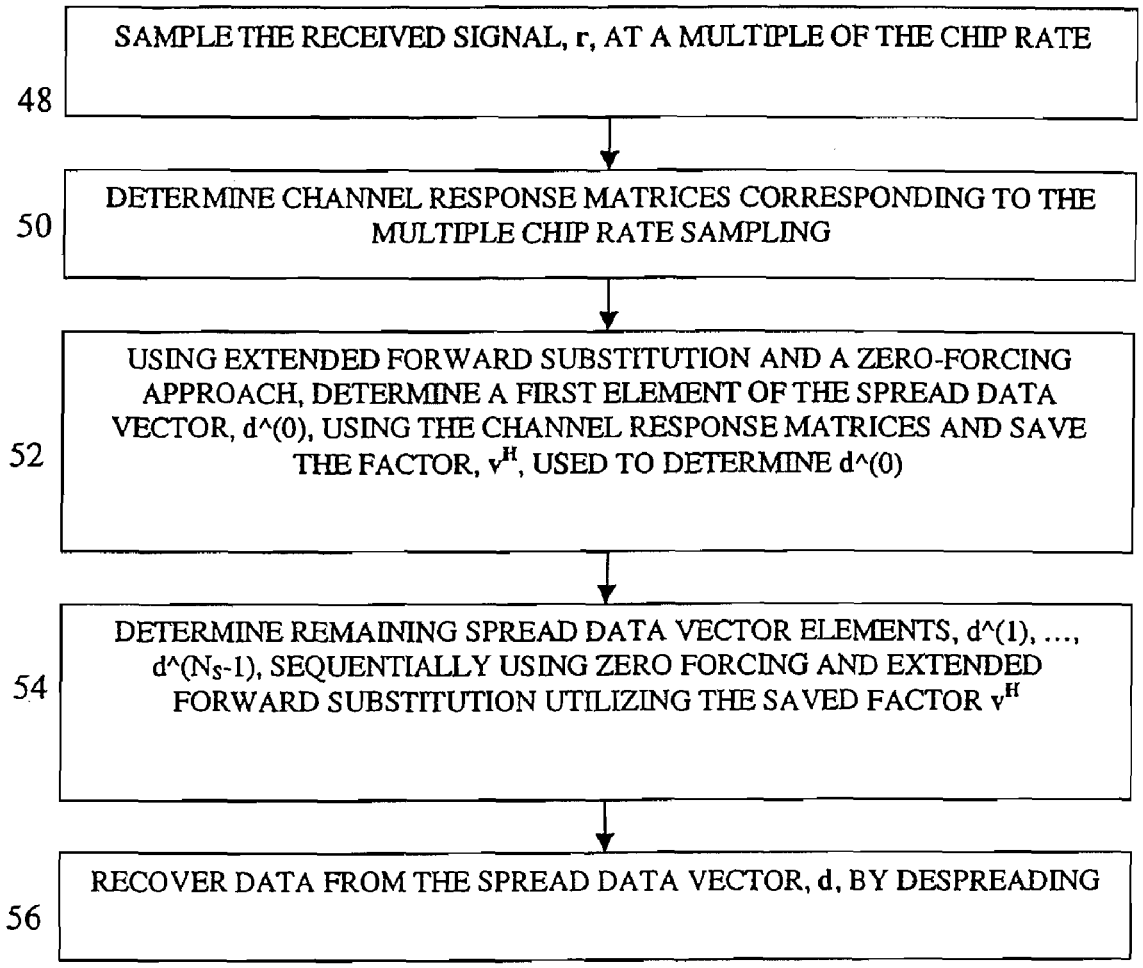
FIG. 4 is a flow chart of an extended forward substitution approach to single user detection (SUD).

One approach to determine the spread data vector is extended forward substitution, which is explained in conjunction with FIG. 4. For extended forward substitution, the received data vector is rearranged so that each even sample is followed by its corresponding odd sample. A similar rearrangement is performed on the channel response matrix, as shown in Equation 5a.

$$\begin{bmatrix} h_1(0) \\ h_2(0) \end{bmatrix} \cdot d(0) = \begin{bmatrix} r_1(0) \\ r_2(0) \end{bmatrix} \quad \text{Equation 6a}$$

$$\hat{d}(0) = \left\{ [h_1(0) h_2(0)] \begin{bmatrix} h_1(0) \\ h_2(0) \end{bmatrix} \right\}^{-1} [h_1(0) \; h_2(0)] \begin{bmatrix} r_1(0) \\ r_2(0) \end{bmatrix} \quad \text{Equation 7a}$$

$$\begin{bmatrix} r_1(0) \\ r_2(0) \\ r_1(1) \\ r_2(1) \\ \vdots \\ r_1(W-1) \\ r_2(W-1) \\ \vdots \\ r_1(N_S-1) \\ r_2(N_S-1) \end{bmatrix} = \begin{bmatrix} h_1(0) & 0 & 0 & \dots & & & & & \\ h_2(0) & 0 & 0 & \dots & & & & & \\ h_1(1) & h_1(0) & 0 & \dots & & & & & \\ h_2(1) & h_2(0) & 0 & \dots & & & & & \\ \vdots & \vdots & \vdots & \dots & & & & & \\ h_1(W-1) & h_1(W-2) & \dots & \dots & h_1(1) & h_1(0) & 0 & 0 \\ h_2(W-1) & h_2(W-2) & \dots & \dots & h_2(1) & h_2(0) & 0 & 0 \\ \vdots & \vdots & & & \vdots & \vdots & \vdots & \vdots \\ 0 & 0 & \dots & h_1(W-1) & h_1(W-2) & \dots & h_1(1) & h_1(0) \\ 0 & 0 & \dots & h_2(W-1) & h_2(W-2) & \dots & h_2(1) & h_2(0) \end{bmatrix} \cdot \begin{bmatrix} d(0) \\ d(1) \\ \vdots \\ \vdots \\ d(N_S-1) \end{bmatrix} + n \quad \text{Equation 5a}$$

Similarly, for an N-multiple of the chip rate sampling, Equation 5b is the arrangement.

Equation 6a is the general formula for d(0). Equation 7a is the zero forcing solution for $\hat{d}(0)$. Similarly, for N-multiple of the chip rate, Equations 6b and 7b are used.

$$\begin{bmatrix} h_1(0) \\ h_2(0) \\ \vdots \\ h_N(0) \end{bmatrix} d(0) = \begin{bmatrix} r_1(0) \\ r_2(0) \\ \vdots \\ r_N(0) \end{bmatrix} \quad \text{Equation 6b}$$

$$\hat{d}(0) = \quad \text{Equation 7b}$$

$$\left\{ [h_1(0) \; \dots \; h_N(0)] \begin{bmatrix} h_1(0) \\ \vdots \\ h_N(0) \end{bmatrix} \right\}^{-1} [h_1(0) \; \dots \; h_N(0)] \begin{bmatrix} r_1(0) \\ \vdots \\ r_N(0) \end{bmatrix}$$

$$\begin{bmatrix} r_1(0) \\ r_2(0) \\ \vdots \\ r_N(0) \\ r_1(1) \\ r_2(1) \\ \vdots \\ r_N(1) \\ \vdots \\ r_1(N_S-1) \\ r_2(N_S-1) \\ \vdots \\ r_N(N_S-1) \end{bmatrix} = \quad \text{Equation 5b}$$

In solving Equations 7a and 7b, for later use $v^H$ is determined as illustrated by Equation 8 for the $v^H$ for Equation 7a and stored, (52).

$$v^H = \left\{ [h_1(0) h_2(0)] \begin{bmatrix} h_1(0) \\ h_2(0) \end{bmatrix} \right\}^{-1} [h_1(0) h_2(0)] \quad \text{Equation 8}$$

$\hat{d}(0)$ is determined using $v^H$ per Equation 9.

$$\hat{d}(0) = v^H \begin{bmatrix} r_1(0) \\ r_2(0) \end{bmatrix} \quad \text{Equation 9}$$

$$\begin{bmatrix} h_1(0) & 0 & \dots & 0 & 0 \\ h_2(0) & 0 & \dots & 0 & 0 \\ \vdots & \vdots & \dots & \vdots & \vdots \\ h_N(0) & 0 & \dots & 0 & 0 \\ h_1(1) & h_1(0) & \dots & 0 & 0 \\ h_2(1) & h_2(0) & \dots & 0 & 0 \\ \vdots & \vdots & \dots & \vdots & \vdots \\ h_N(1) & h_N(0) & \dots & 0 & 0 \\ \vdots & \vdots & \dots & \vdots & \vdots \\ 0 & 0 & \dots & h_1(1) & h_1(0) \\ 0 & 0 & \dots & h_2(1) & h_2(0) \\ \vdots & \vdots & \dots & \vdots & \vdots \\ 0 & 0 & \dots & h_N(1) & h_N(0) \end{bmatrix} \cdot \begin{bmatrix} d(0) \\ d(1) \\ \vdots \\ d(N_S-1) \end{bmatrix} + n$$

Using the Toenlitz structure of the H matrix, the remaining spread data elements can be determined sequentially using zero forcing per Equation 10a, (54).

$d(i)$ is the $i^{th}$ element of the spread data vector, d. The length of the spread data vector is $N_S$. Using extended forward substitution, the zero-forcing solution to determine d(0), $\hat{d}(0)$, is per Equations 6a and 7a, (52).

$$\hat{d}(i) = \quad \text{Equation 10a}$$

-continued $$v^H \left\{ \begin{bmatrix} r_1(i) \\ r_2(i) \end{bmatrix} - \begin{bmatrix} h_1(i) \\ h_2(i) \end{bmatrix} d^\wedge(0) + \sum_{j=1}^{i-1} - \begin{bmatrix} h_1(j) \\ h_2(j) \end{bmatrix} d^\wedge(i-j-1) \right\}$$

For an N-multiple of the chip rate, Equation 10b is used.

$$d^\wedge(i) = \qquad\qquad\qquad\qquad \text{Equation 10b}$$

$$v^H \left\{ \begin{bmatrix} r_1(i) \\ \vdots \\ r_N(i) \end{bmatrix} - \begin{bmatrix} h_1(i) \\ \vdots \\ h_N(i) \end{bmatrix} \hat{d}(0) - \sum_{j=1}^{i-1} \begin{bmatrix} h_1(j) \\ \vdots \\ h_N(j) \end{bmatrix} \cdot d(i-j-1) \right\}$$

After the spread data vector is determined, each communication burst's data is determined by despreading, such as by mixing the spread data vector with each burst's code, (56).

The complexity in using the extended forward substitution approach, excluding despreading, is summarized in Table 1.

TABLE 1

| | |
|---|---|
| Calculating $v^H$ | 4 multiplications & 1 reciprocal |
| Calculating $\hat{d}(0)$ | 2 multiplications |
| Calculating $\hat{d}(1)$ | 4 multiplications |
| Calculating each up to $\hat{d}(W-1)$ | 2 multiplications |
| Calculating each $\hat{d}(i)$ from $\hat{d}(w)$ to $\hat{d}(N_S-1)$ | $2W + 2$ multiplications |
| Total Number of Multiplications | $2N_S + (W-1) \cdot W + 2W \ldots (N_S - W + 1)$ |
| Total Number of Calculations | $2N_S + (W-1) \cdot W + 2W \ldots (N_S - W + 1) + 5$ |

For a TDD burst type II, $N_S$ is 1104 and W is 57, solving for d using extended forward substitution 200 times per second requires 99.9016 million real operations per second (MROPS) for twice the chip rate sampling or 49.95 MROPS for chip rate sampling.

Figure 5:
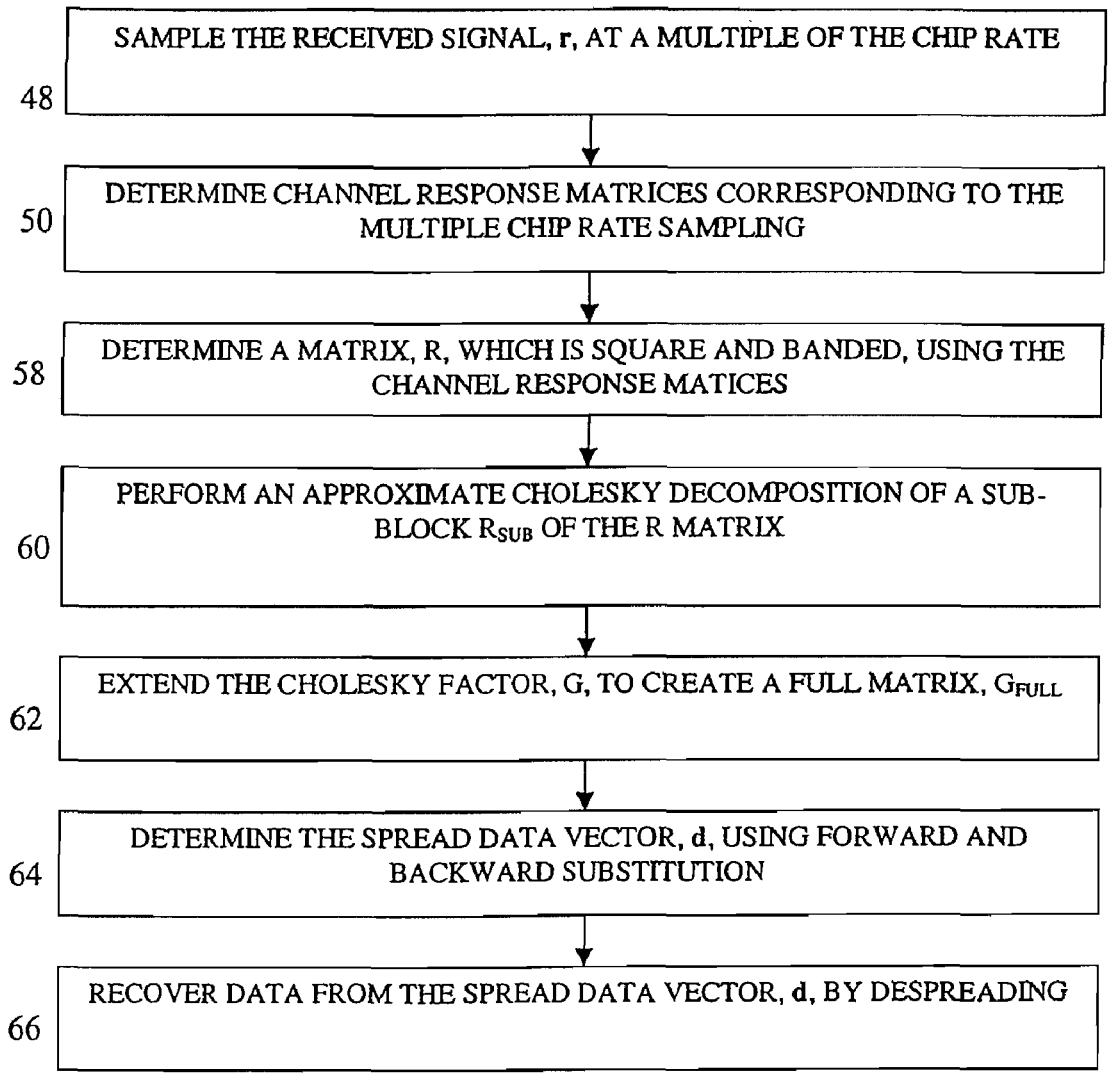
FIG. 5 is a flow chart of an approximate banded Cholesky approach to SUD.

Another approach to estimate data is an approximate banded Cholesky approach, which is explained in conjunction with FIG. 5. A cross correlation matrix R is determined so that it is square, ($N_S$ by $N_S$), and banded per Equation 11, (58).

$$R = H^H H \qquad\qquad\qquad \text{Equation 11}$$

$(\cdot)^H$ indicates the Hermitian function. H is of size $2(N_S+W-1)$ by $N_S$. Equation 11 is rewritten as Equation 12a for twice the chip rate sampling.

$$R = [H_1^H H_2^H] \cdot \begin{bmatrix} H1 \\ H2 \end{bmatrix} = H_1^H H_1 + H_2^H H_2 \qquad \text{Equation 12a}$$

For an N-multiple of the chip rate, Equation 12b is used.

$$R = [H_1^H, H_2^H \ldots H_N^H] \begin{bmatrix} H_1 \\ H_2 \\ \vdots \\ H_N \end{bmatrix} \qquad \text{Equation 12b}$$

or $$R = \sum_{i=1}^{N} H_i^H H_i$$

Using Equation 12a or 12b, the resulting R is of size $N_S$ by $N_S$ and banded as illustrated in Equation 13 for twice the chip rate sampling, W=3 and $N_S$=10.

$$R = \begin{bmatrix} R_0 & R_1 & R_2 & 0 & 0 & 0 & 0 & 0 & 0 & 0 \\ R_1 & R_0 & R_1 & R_2 & 0 & 0 & 0 & 0 & 0 & 0 \\ R_2 & R_1 & R_0 & R_1 & R_2 & 0 & 0 & 0 & 0 & 0 \\ 0 & R_2 & R_1 & R_0 & R_1 & R_2 & 0 & 0 & 0 & 0 \\ 0 & 0 & R_2 & R_1 & R_0 & R_1 & R_2 & 0 & 0 & 0 \\ 0 & 0 & 0 & R_2 & R_1 & R_0 & R_1 & R_2 & 0 & 0 \\ 0 & 0 & 0 & 0 & R_2 & R_1 & R_0 & R_1 & R_2 & 0 \\ 0 & 0 & 0 & 0 & 0 & R_2 & R_1 & R_0 & R_1 & R_2 \\ 0 & 0 & 0 & 0 & 0 & 0 & R_2 & R_1 & R_0 & R_1 \\ 0 & 0 & 0 & 0 & 0 & 0 & 0 & R_2 & R_1 & R_0 \end{bmatrix} \quad \text{Equation 13}$$

In general, the bandwidth of R is per Equation 14.

$$p = W - 1 \qquad\qquad\qquad \text{Equation 14}$$

Using an approximate Cholesky approach, a sub-block of R, $R_{sub}$, of size $N_{col}$ by $N_{col}$ is used. A typical size of $R_{sub}$ is 2W−1 by 2W−1, although other sized matrices may be used. The sub-block, $R_{sub}$, is decomposed using Cholesky decomposition per Equation 15, (60).

$$R_{sub} = GG^H \qquad\qquad\qquad \text{Equation 15}$$

The Cholesky factor G is of size $N_{col}$ by $N_{col}$. An illustration of a 5×5 G matrix with W=3 is per Equation 16.

$$G = \begin{bmatrix} G_{11} & 0 & 0 & 0 & 0 \\ G_{21} & G_{22} & 0 & 0 & 0 \\ G_{31} & G_{32} & G_{33} & 0 & 0 \\ 0 & G_{42} & G_{43} & G_{44} & 0 \\ 0 & 0 & G_{53} & G_{54} & G_{55} \end{bmatrix} \quad \text{Equation 16}$$

$G_{ij}$ is the element of the G matrix at the $i^{th}$ column and $j^{th}$ row. The G matrix is extended to an $N_S$ by $N_S$ matrix, $G_{full}$, by right shifting the bottom row of G by one element for each row after the last row of G, (62). For $N_S$=10, the illustration of Equation 16 is expanded per Equation 17, (62).

$$G_{full} =$$

Equation 17

$$\begin{bmatrix} G_{11} & 0 & & & & & & & & \\ G_{21} & G_{22} & 0 & & & & & & & \\ G_{31} & G_{32} & G_{33} & 0 & & & & & & \\ 0 & G_{42} & G_{43} & G_{44} & 0 & & & & & \\ & 0 & G_{53} & G_{54} & G_{55} & 0 & & & & \\ & & 0 & G_{53} & G_{54} & G_{55} & 0 & & & \\ & & & 0 & G_{53} & G_{54} & G_{55} & 0 & & \\ & & & & 0 & G_{53} & G_{54} & G_{55} & 0 & \\ & & & & & 0 & G_{53} & G_{54} & G_{55} & 0 \\ & & & & & & 0 & G_{53} & G_{54} & G_{55} \end{bmatrix}$$

The spread data vector is determined using forward and backward substitution, (64). Forward substitution is used to determine y per Equation 18a for twice the chip rate sampling and Equation 18b for a multiple N of the chip rate sampling.

$$G_{full}y = H_1^H r_1 + H_2^H r_2 \quad \text{Equation 18a}$$

$$G_{full}y = H_1^H r_1 + H_2^H r_2 + \ldots + H_N^H r_N \quad \text{Equation 18b}$$

Backward substitution is subsequently used to solve for the spread data vector per Equation 19.

$$G_{full}^H d = y \quad \text{Equation 19}$$

After the spread data vector, d, is determined, each burst's data is determined by despreading, (66).

The complexity of approximate Cholesky decomposition, excluding despreading, for twice the chip rate sampling is per Table 2.

TABLE 2

| Operation | Number of Calculations |
|---|---|
| Calculating $H^H H$ | $W(W + 1)$ |
| Calculating Cholesky Decomposition | $\dfrac{N_{col}(W-1)^2}{2} + \dfrac{3N_{col}(W-1)}{2} - \dfrac{(W-1)^3}{3} - (W-1)^2 - \dfrac{2(W-1)}{3}$ |
| Calculating $H^H r$ | $2N_S W$ |
| Forward Substitution | $\left[N_S - \dfrac{(W-1)}{2}\right]W$ and the reciprocal of $N_S$ real numbers |
| Backward Substitution | $\left[N_S - \dfrac{(W-1)}{2}\right]W$ and the reciprocal of $N_S$ real numbers |

For a TDD burst type II, $N_S$ is 1104 and for W is 57, performing approximate banded Cholesky 200 times per second at twice the chip rate requires 272.56 MROPS. By contrast, an exact banded Cholesky approach requires 906.92 MROPS. For chip rate sampling, the approximate banded Cholesky approach requires 221.5 MROPS.

Figure 6:
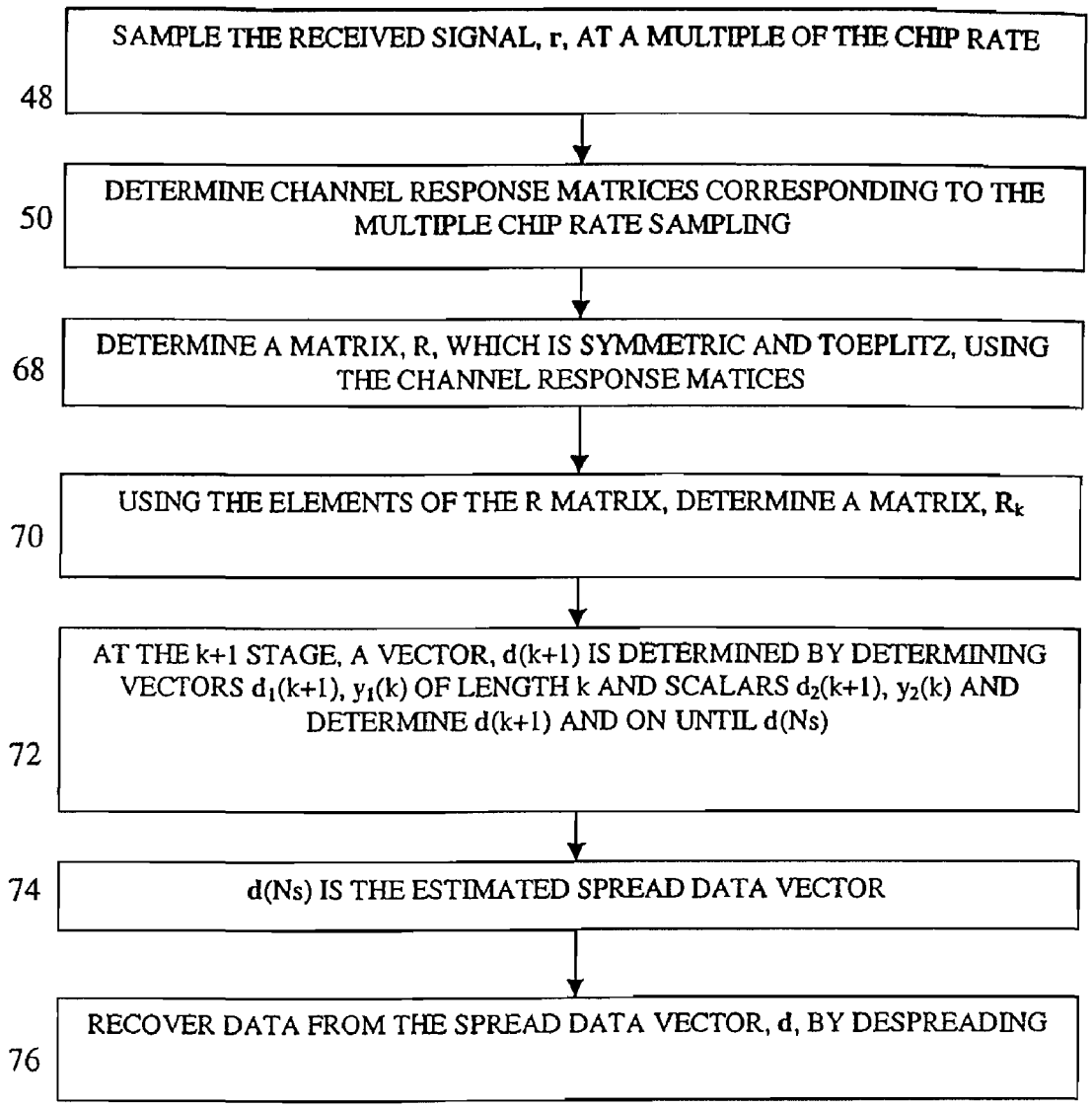
FIG. 6 is a flow chart of a Toeplitz approach to SUD.

Another approach for data detection uses a Toeplitz approach, (Levinson-Durbin type algorithm), which is explained in conjunction with FIG. 6. The R matrix of Equation 12a and 12b is reproduced here.

$$R = [H_1^H \ H_2^H] \cdot \begin{bmatrix} H1 \\ H2 \end{bmatrix} = H_1^H H_1 + H_2^H H_2 \quad \text{Equation 12a}$$

For an N-multiple of the chip rate, Equation 12b is used.

$$R = [H_1^H, H_2^H \ldots H_N^H] \begin{bmatrix} H_1 \\ H_2 \\ \vdots \\ H_N \end{bmatrix} \quad \text{Equation 12b}$$

or $$R = \sum_{i=1}^{N} H_i^H H_i$$

The R matrix is symmetric and Toeplitz with a bandwidth of p=W−1, (68). A left most upper corner of the R matrix, R(k), being a k by k matrix is determined as shown in Equation 20.

$$R(k) = \begin{bmatrix} R_0 & R_1 & \ldots & R_{k-1} \\ R_1 & R_0 & & \vdots \\ & & \ddots & \\ R_{k-1} & R_{k-2} & \ldots & R_0 \end{bmatrix} \quad \text{Equation 20}$$

Additionally, another vector $R_k$ is determined using elements of R, per Equation 21, (72).

$$R_k = \begin{bmatrix} R_1 \\ R_2 \\ \vdots \\ R_k \end{bmatrix} \quad \text{Equation 21}$$

Bolding indicates a matrix including all elements up to its subscript. At stage k+1, the system is solved per Equation 22.

$$R(k+1)d(k+1) = [H^H r]_{k+1} \quad \text{Equation 22}$$

$[H^H r]_{k+1}$ is the first (k+1) components of $H^H r$. d(k+1) is broken into a vector $d_1(k+1)$ of length k and a scalar $d_2(k+1)$ as per Equation 23.

$$d(k+1)\begin{bmatrix} d_1(k+1) \\ d_2(k+1) \end{bmatrix}. \quad \text{Equation 23}$$

The matrix R(k+1) is decomposed as per Equation 24.

$$R(k+1) = \begin{bmatrix} R(k) & \vdots & E_k R_k \\ \ldots & \vdots & \ldots \\ R_k^H E_k & \vdots & R_0 \end{bmatrix}. \quad \text{Equation 24}$$

$E_k$ is an exchange matrix. The exchange matrix operates on a vector by reversing that vector's elements.

Using the Yule-Walker equation for linear prediction, Equation 25 results, (78).

$$\begin{bmatrix} R(k-1) & \vdots & E_{k-1}R_{k-1} \\ \ldots & \vdots & \ldots \\ R_{k-1}^H E_{k-1} & \vdots & R_0 \end{bmatrix} \begin{bmatrix} y_1(k) \\ y_2(k) \end{bmatrix} = -\begin{bmatrix} R_{k-1} \\ R_k \end{bmatrix} \quad \text{Equation 25}$$

Using order recursions, Equations 26, 27 and 28 result.

$$y_1(k) = y(k-1) + y_2(k)E_{k-1}y(k-1) \quad \text{Equation 26}$$

$$y_2(k) = -\frac{[R_k + R_{k-1}^H E_{k-1}y(k-1)]}{[1 + R_{k-1}^H y(k-1)]} \quad \text{Equation 27}$$

$$y(k) = \begin{bmatrix} y_1(k) \\ y_2(k) \end{bmatrix} \quad \text{Equation 28}$$

Using y(k), d(k+1) is determined per Equations 29, 30 and 31, (74).

$$d_1(k+1) = d(k) + d_2(k+1)E_k y(k) \quad \text{Equation 29}$$

$$d_2(k+1) = \left[\frac{(H^H r)_{k+1} - R_k^H E_k d(k)}{1 + R_k^H y(k)}\right] \quad \text{Equation 30}$$

$$d(k+1) = \begin{bmatrix} d_1(k+1) \\ d_2(k+1) \end{bmatrix} \quad \text{Equation 31}$$

$(H^H r)_{k+1}$ is the $(k+1)^{th}$ element of $H^H r$.

After properly initializing the recursions, the recursions are computed for k=1, 2, ..., $N_S$. $d(N_S)$ is a solution to Equation 32, (74).

$$Rd = H^H r \quad \text{Equation 32}$$

The spread data vector d is despread with the bursts' channelization codes to recover the data, (76).

The banded structure of R affects the recursions as follows. R(2) and $R_2$ are per Equation 33.

$$R(2) = \begin{bmatrix} R_0 & R_1 \\ R_1 & R_0 \end{bmatrix}, R_2 = \begin{bmatrix} R_1 \\ R_2 \end{bmatrix} \quad \text{Equation 33}$$

The inner product calculations in Equations 27 and 30 require two multiplications each. To illustrate, the R matrix of Equation 20 for k=6 is per Equation 34.

$$R(6) = \begin{bmatrix} R_0 & R_1 & R_2 & 0 & 0 & 0 \\ R_1 & & & R_2 & 0 & 0 \\ R_2 & & & & R_2 & 0 \\ 0 & R_2 & & & & R_2 \\ 0 & 0 & R_2 & & & R_1 \\ 0 & 0 & 0 & R_2 & & R_0 \end{bmatrix}, R_6 = \begin{bmatrix} R_1 \\ R_2 \\ 0 \\ 0 \\ 0 \\ 0 \end{bmatrix} \quad \text{Equation 34}$$

The number of non-zero elements in the vector $R_6$ is equal to the bandwidth, p, of the matrix R. When the inner product of $R_6^H E_6 y(k)$ in Equation 27 and the inner product $R_6^H E_6 d(k)$ in Equation 30 are calculated, only p (and not k) multiplications are required. For the recursions of Equations 26 and 29, no computational reductions are obtained.

Table 3 shows the complexity in implementing the Toeplitz approach.

TABLE 3

| Calculation | # of Calculations | MROPS |
| --- | --- | --- |
| Functions Executed Once Per Burst Calculating $H^H H$ | | 1.3224 |
| Solving Yule-Walker for y | $672.888 \times \frac{100}{10^6}$ | 269.1552 |
| Functions Executed Twice Per Burst Calculating $H^H r$ | | 100.68 |
| Solving R(k + 1)d(k + 1)$H^H$r | $672.888 \times \frac{200}{10^6}$ | 538.3104 |

The total MROPS for the Toeplitz approach for a TDD burst type is 909.4656 MROPS for twice the chip rate sampling and 858.4668 MROPS for chip rate sampling.

Figure 7:
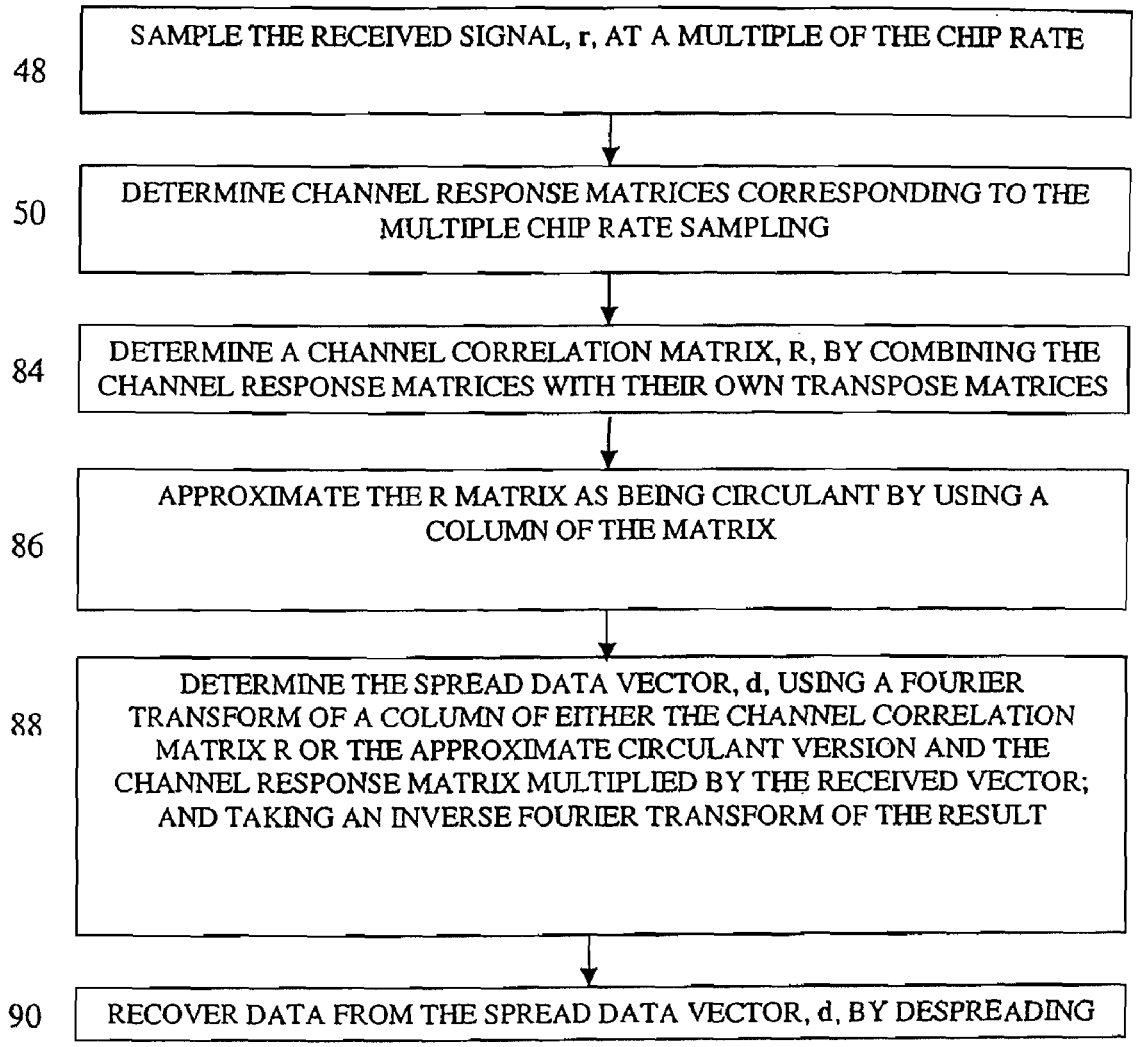
FIG. 7 is a flow chart of a fast fourier transform (FFT) approach applied to the channel correlation matrix for SUD.

Another approach for data detection uses fast fourier transforms (FFTs), which is explained using FIG. 7. If chip rate sampling is used, the channel matrix H is square except for edge effects. Using a circulant approximation for the H matrix, a FFT of the received vector, r, and the channel vector, H, to obtain the data estimate is used.

For a multiple of the chip rate sampling, such as twice the chip rate, the H matrix is not square or circulant. However, a submatrix, shown by dotted lines, of the channel correlation matrix $R = H^H H$ matrix of Equation 13, (84), as shown for Equation 35a is circulant.

$$R = \begin{bmatrix} R_0 & R_1 & R_2 & 0 & 0 & 0 & 0 & 0 & 0 & 0 \\ R_1 & R_0 & R_1 & R_2 & 0 & 0 & 0 & 0 & 0 & 0 \\ \ldots & \ldots & \ldots & \ldots & \ldots & \ldots & \ldots & \ldots & \ldots & \ldots \\ R_2 & R_1 & R_0 & R_1 & R_2 & 0 & 0 & 0 & 0 & 0 \\ 0 & R_2 & R_1 & R_0 & R_1 & R_2 & 0 & 0 & 0 & 0 \\ 0 & 0 & R_2 & R_1 & R_0 & R_1 & R_2 & 0 & 0 & 0 \\ 0 & 0 & 0 & R_2 & R_1 & R_0 & R_1 & R_2 & 0 & 0 \\ 0 & 0 & 0 & 0 & R_2 & R_1 & R_0 & R_1 & R_2 & 0 \\ 0 & 0 & 0 & 0 & 0 & R_2 & R_1 & R_0 & R_1 & R_2 \\ \ldots & \ldots & \ldots & \ldots & \ldots & \ldots & \ldots & \ldots & \ldots & \ldots \\ 0 & 0 & 0 & 0 & 0 & 0 & R_2 & R_1 & R_0 & R_1 \\ 0 & 0 & 0 & 0 & 0 & 0 & 0 & R_2 & R_1 & R_0 \end{bmatrix} \quad \text{Equation 35a}$$

For an N-multiple of the chip rate sampling, the channel correlation matrix is determined per Equation 35b.

$$R = [H_1^H\ H_2^H\ \ldots\ H_N^H] \begin{bmatrix} H_1 \\ H_2 \\ \vdots \\ H_N \end{bmatrix} = \sum_{i=1}^{N} H_i^H H_i \quad \text{Equation 35b}$$

By approximating the R matrix as being circulant, Equations 36, 37 and 38 are used.

$$R^H = D\Delta D^H \quad \text{Equation 36}$$

$$\Delta = \text{diag}(D(R)_1) \quad \text{Equation 37}$$

$$\hat{d} = \text{diag}\left(D\begin{bmatrix} R_0 \\ R_1 \\ R_2 \\ 0 \\ \vdots \\ 0 \end{bmatrix}\right)$$

$(R)_1$ is the first column of the R matrix expanded to a diagonal matrix. Although described using the first column, this approach can be modified to use any column of the R matrix, (86). However, it is preferred to use a column having the most non-zero elements of any column, such as $R_2, R_1, R_0, R_1, R_2$. These columns are typically any column at least W columns from both sides, such as any column between and including W and $N_S-W-1$. Equations 38 and 39 are used in a zero-forcing equalization approach.

$$R\hat{d} = H^H r \quad \text{Equation 38}$$

$$\hat{d} = R^{-1}(H^H r) \quad \text{Equation 39}$$

Since D is an orthogonal discrete fourier transform (DFT) matrix, Equations 40, 41 and 42 result.

$$D^H D = N_S I \quad \text{Equation 40}$$

$$D^{-1} = (1/N_S)D^H \quad \text{Equation 41}$$

$$R^{-1} = \frac{1}{N_S}D^H \Delta^{-1} \frac{1}{N_S}D \quad \text{Equation 42}$$

Accordingly, $\hat{d}$ can be determined using a fourier transform per Equations 43, 44 and 45a.

$$R^{-1} = \frac{1}{N_S^2}D^H \Delta^{-1}[D(H^H r)] \quad \text{Equation 43}$$

$$D^H \hat{d} = \frac{1}{N_S}\Delta^{-1}[F(H^H r)] \quad \text{Equation 44}$$

$$F(\hat{d}) = \frac{F(H^H r)}{N_S F((R)_1)} \quad \text{Equation 45a}$$

$(•)_1$ is the first column, although an analogous equation can be used for any column of R. $F(•)$ denotes a fourier transform function. $F(H^H r)$ is preferably calculated using FFTs per Equation 45b.

$$F(H^H r) = N_c[F(h_1)F(r_1) + \ldots + F(h_N)F(r_N)] \quad \text{Equation 45b}$$

Taking the inverse fourier transform $F^{-1}(•)$, of the result of Equation 45a produces the spread data vector, (88). The transmitted data can be recovered by despreading using the appropriate codes, (90).

The complexity of this FFT approach is shown in Table 4.

TABLE 4

| Functions Executed Once Per Burst Calculation | # of Calculations | MROPS |
|---|---|---|
| Calculating $H^H H$ | | 1.3224 |
| $F([R]_1) \cdot N_S \log_2 N_S$ | $11160 \times \frac{100}{10^6}$ | 4.4640 |
| Functions Executed Twice Per Burst Calculating $H^H r$ by FFT | | 38 |
| Calculating Equation 45 | | 0.8832 |
| $F^{-1}(d) \cdot N_S \log_2 N_S$ | | 8.9280 |
| Total | | 55 MROPS |

The FFT approach is less complex than the other approaches. However, a performance degradation results from the circulant approximation.

Figure 8:
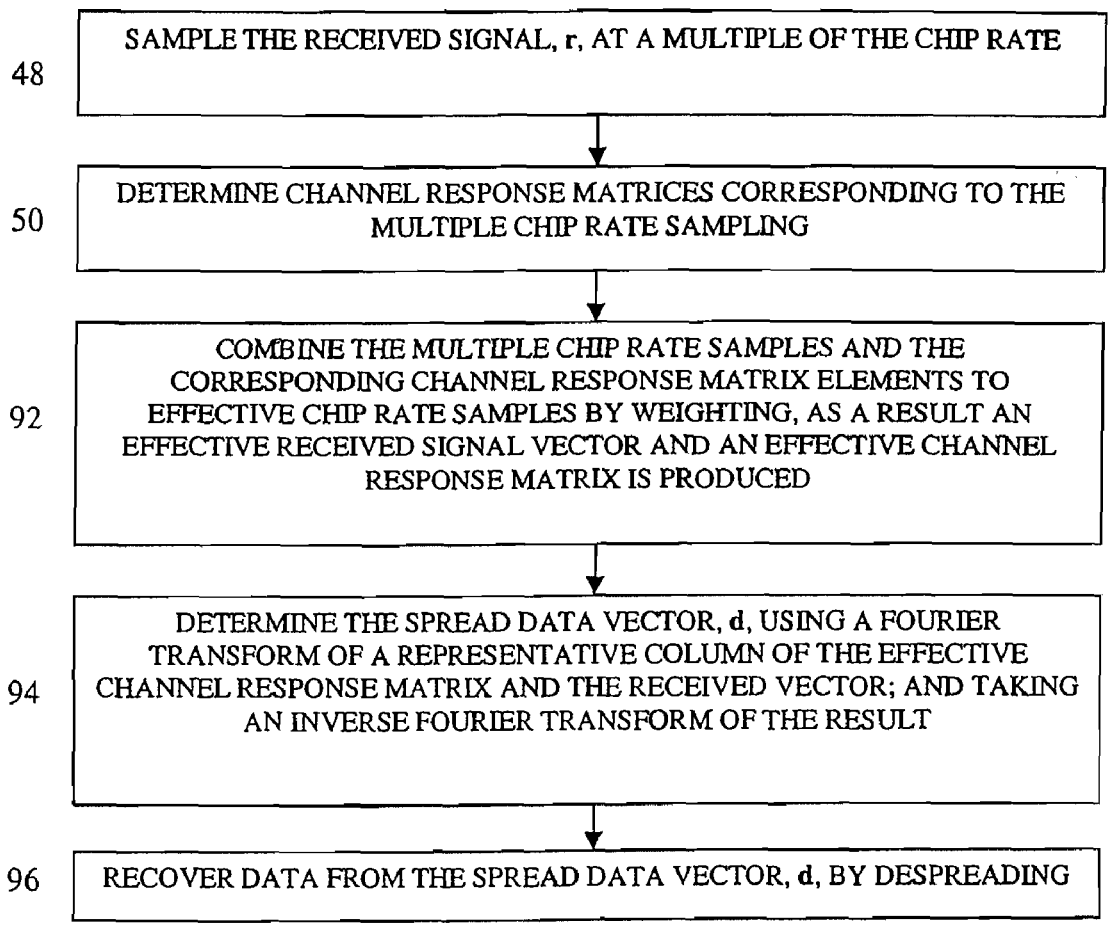
FIG. 8 is a flow chart of a FFT approach to SUD using effective combining.

Another approach to use FFTs to solve for the data vector for a multiple of the chip rate sampling combines the samples by weighing, as explained using FIG. 8. To illustrate for twice the chip rate sampling, $r_1$ is the even and $r_2$ is the odd samples. Each element of $r_1$, such as a first element $r_1(0)$, is weighted and combined with a corresponding element of $r_2$, such as $r_2(0)$ per Equation 46.

$$r_{\text{eff}}(0) = W_1 r_1(0) + W_2 r_2(0) \quad \text{Equation 46}$$

$r_{\text{eff}}(0)$ is the effectively combined element of an effectively combined matrix, $r_{\text{eff}}$. $W_1$ and $W_2$ are weights. For N-times the chip rate sampling, Equation 47 is used.

$$r_{\text{eff}}(0) = W_1 r_1(0) + \ldots + W_n r_n(0) \quad \text{Equation 47}$$

Analogous weighting of the channel response matrices, $H_1$ to $H_n$, is performed to produce $H_{\text{eff}}$, (92). As a result, Equation 3 becomes Equation 48.

$$r_{\text{eff}} = H_{\text{eff}} d + n \quad \text{Equation 48}$$

The resulting system is an $N_S$ by $N_S$ system of equations readily solvable by FFTs per Equation 49, (94).

$$F(d) = \frac{F(r_{\text{eff}})}{F((H_{\text{eff}})_1)} \quad \text{Equation 49}$$

Using the inverse fourier transform, the spread data vector is determined. The bursts' data is determined by despreading the spread data vector using the bursts' code, (96). Although Equation 49 uses the first column of $H_{\text{eff}}$, the approach can be modified to use any representative column of, $H_{\text{eff}}$.

Figure 9:
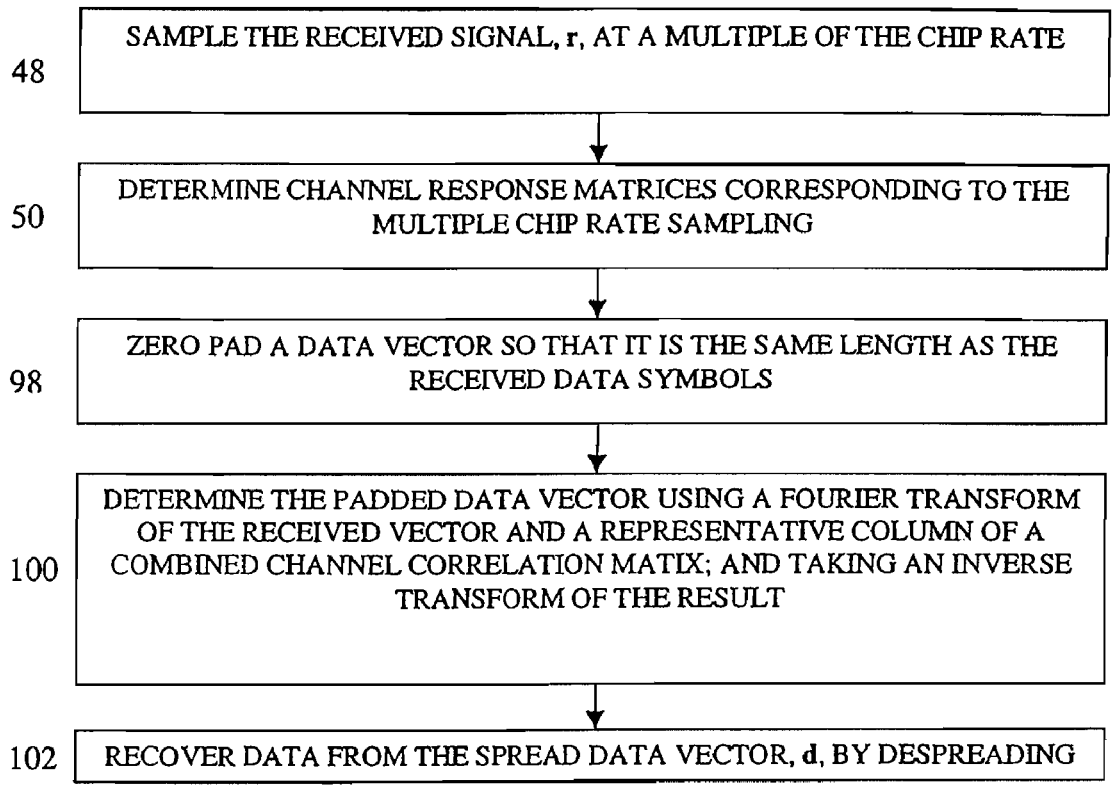
FIG. 9 is a flow chart of a FFT approach to SUD using zero padding.

Another approach using FFTs uses zero padding, which is explained using FIG. 9. Equation 5 is modified by zero padding the data vector so that every other element, such as the even elements are zero, (98). The modified d matrix is d. The H matrix is also expanded to form H. H matrix is expanded by repeating each column to the right of that column and shifting each element down one row and zero padding the top of the shifted column. An illustration of such a system for twice the chip rate sampling, W=3 and $N_S$=4 is per Equation 49a.

$$\begin{bmatrix} r_1(0) \\ r_2(0) \\ r_1(1) \\ r_2(1) \\ r_1(2) \\ r_2(2) \\ r_1(3) \\ r_2(3) \end{bmatrix} = \begin{bmatrix} h_1(0) & & & & & & & \\ h_2(0) & h_1(0) & & & & & & \\ h_1(1) & h_2(0) & h_1(0) & & & & & \\ h_2(1) & h_1(1) & h_2(0) & h_1(0) & & & & \\ h_1(2) & h_2(1) & h_1(1) & h_2(0) & h_1(0) & h_2(0) & & \\ h_2(2) & h_1(2) & h_2(1) & h_1(1) & h_2(0) & h_1(0) & h_2(0) & \\ 0 & h_2(2) & h_1(2) & h_2(1) & h_1(1) & h_2(0) & h_1(0) & h_2(0) \\ 0 & 0 & h_2(2) & h_1(2) & h_2(1) & h_1(1) & h_2(0) & h_1(0) \end{bmatrix} \begin{bmatrix} d(0) \\ 0 \\ d(1) \\ 0 \\ d(2) \\ 0 \\ d(3) \\ 0 \end{bmatrix} + n \quad \text{Equation 49a}$$

For an N-multiple of the chip rate, Equation 49b is used as shown for simplicity for $N_S=3$.

$$\begin{bmatrix} r_1(0) \\ r_2(0) \\ \vdots \\ r_N(0) \\ r_1(1) \\ r_2(1) \\ \vdots \\ r_N(1) \\ r_1(2) \\ r_2(2) \\ \vdots \\ r_{N-1}(2) \\ r_N(2) \end{bmatrix} = \begin{bmatrix} h_1(0) & 0 & \ldots & 0 \\ h_2(0) & h_1(0) & \ldots & 0 \\ \vdots & \vdots & \ldots & \vdots \\ h_N(0) & h_{N-1}(0) & \ldots & 0 \\ h_1(1) & h_N(0) & \ldots & 0 \\ h_2(1) & h_1(1) & \ldots & 0 \\ \vdots & \vdots & \ldots & \vdots \\ h_N(1) & h_{N-1}(1) & \ldots & 0 \\ 0 & h_N(1) & \ldots & 0 \\ 0 & 0 & \ldots & 0 \\ \vdots & \vdots & \ldots & \vdots \\ 0 & 0 & \ldots & h_2(0) \\ 0 & 0 & \ldots & h_1(0) \end{bmatrix} \begin{bmatrix} d(0) \\ 0 \\ \vdots \\ 0 \\ d(1) \\ 0 \\ \vdots \\ 0 \\ d(2) \\ 0 \\ \vdots \\ 0 \\ 0 \end{bmatrix} + n \quad \text{Equation 49b}$$

In general, the Hmatrix for an N multiple is (N $N_S$) by (N $N_S$). The matrix His square, Toeplitz and approximately circulant and is of size $2N_S$ by $2N_S$. The zero forcing solution is per Equation 50, (100).

$$F(d\tilde{\ }) = \frac{F(r)}{F((H\tilde{\ })_1)} \quad \text{Equation 50}$$

A column other than the first column may be used in an analogous FFT. Furthermore, since any column may be used, a column from the original channel response matrix, H or an estimated expanded column of the Hderived from a column of H. Using every $N^{th}$ value from d, d is estimated. Using the appropriate codes, d is despread to recover the data, (102).

What is claimed is:

1. A method of processing code division multiple access communications comprising:
   receiving over a shared spectrum a combined signal of a plurality of different data signals that had been transmitted concurrently from a communication station at a chip rate where each different data signal is associated with a respective code;
   sampling the combined signal at a multiple of the chip rate to produce combined signal samples;
   estimating a channel response for the combined signal at the multiple of the chip rate;
   determining a spread data vector using the combined signal samples and the estimated channel response; and
   estimating data of each of the different data signals using the spread data vector and the respective data signal codes.

2. The method of claim 1 wherein the determining of a spread data vector includes:
   determining a first element of a spread data vector using the combined signal samples and the estimated channel response; and
   using a factor from the first element determination to determine remaining elements of the spread data vector.

3. The method of claim 1 wherein the data estimating is by despreading the spread data vector.

4. The method of claim 1 wherein the determining of a spread data vector includes:
   determining a cross correlation matrix using the estimated channel response;
   selecting a subblock of the cross correlation matrix;
   determining a Cholesky factor for the subblock;
   extending the Cholesky factor; and
   determining the spread data vector using the extended Cholesky factor, a version of the channel response and the combined signal samples.

5. The method of claim 1 wherein the determining of a spread data vector includes:
   determining a cross correlation matrix using the estimated channel response; and
   determining the spread data vector using order recursions by determining a first spread data estimate using an element from the cross correlation matrix and recursively determining further estimates using additional elements of the cross correlation matrix.

6. The method of claim 1 wherein the determining of a spread data vector includes:
   determining a column of a channel correlation matrix using the estimated channel response; and
   determining the spread data vector using the determined column, the estimated channel response, the received combined signal and a fourier transform.

7. The method of claim 1 wherein the determining of a spread data vector includes:
   combining the combined signal samples as effective chip rate samples;
   combining the multiple chip rate estimated channel response as an effective chip rate channel response; and
   determining a spread data vector using the effective chip rate samples, the effective chip rate channel response and a fourier transform.

8. The method of claim 1 wherein the estimating of the channel response is as a channel response matrix for the combined signal at the multiple of the chip rate and the determining of a spread data vector includes:
   determining a padded version of a spread data vector of a size corresponding to the multiple chip rate using a column of the channel response matrix, the estimated channel response matrix, the combined signal samples and a fourier transform; and estimating the spread data vector by eliminating elements of the padded version so that the estimated spread data vector is of a size corresponding to the chip rate.

9. A wireless communication apparatus for code division multiple access communications comprising:

a receiver configured to receive over a shared spectrum a combined signal of a plurality of different data signals that were transmitted concurrently at a chip rate where each different data signal is associated with a respective code;

a sampling device configured to sample the combined signal at a multiple of the chip rate to produce combined signal samples;

channel response estimation circuitry configured to estimate a channel response for the combined signal at the multiple of the chip rate;

spread data vector determination circuitry configured to determine a spread data vector using the combined signal samples and the estimated channel response; and data signal estimation circuitry configured to estimate data of the different data signals using the spread data vector and the respective data signal codes.

10. The communication apparatus of claim 9 wherein the spread data vector determination circuitry is configured to determine a spread data vector by determining a first element of a spread data vector using the combined signal samples and the estimated channel response and by using a factor from the first element determination to determine remaining elements of the spread data vector.

11. The communication apparatus of claim 9 wherein the data signal estimation circuitry is configured to estimate data by despreading the spread data vector.

12. The communication apparatus of claim 9 wherein the spread data vector determination circuitry is configured to determine a cross correlation matrix using the estimated channel response, to select a subblock of the cross correlation matrix, to determine a Cholesky factor for the subblock, to extend the Cholesky factor and to determine the spread data vector using the extended Cholesky factor, a version of the channel response and the combined signal samples.

13. The communication apparatus of claim 9 wherein the spread data vector determination circuitry is configured to determine a cross correlation matrix using the estimated channel response and to determine the spread data vector using order recursions by determining a first spread data estimate using an element from the cross correlation matrix and recursively determining further estimates using additional elements of the cross correlation matrix.

14. The communication apparatus of claim 9 wherein the spread data vector determination circuitry is configured to determine a column of a channel correlation matrix using the estimated channel response and to determine the spread data vector using the determined column, the estimated channel response, the received combined signal and a fourier transform.

15. The communication apparatus of claim 9 wherein the spread data vector determination circuitry is configured to combine the combined signal samples as effective chip rate samples, to combine the multiple chip rate estimated channel response as an effective chip rate channel response, and to determine a spread data vector using the effective chip rate samples, the effective chip rate channel response and a fourier transform.

16. The communication apparatus of claim 9 wherein:

the channel response estimation circuitry is configured to estimate the channel response as a channel response matrix for the combined signal at the multiple of the chip rate and the spread data vector determination circuitry is configured to determine a padded version of a spread data vector of a size corresponding to the multiple chip rate using a column of the channel response matrix, the estimated channel response matrix, the combined signal samples and a fourier transform, and to estimate the spread data vector by eliminating elements of the padded version so that the estimated spread data vector is of a size corresponding to the chip rate.

17. The communication apparatus of claim 9 configured as a base station for a third generation partnership project (3GPP) universal terrestrial radio access (UTRA) system.

18. The communication apparatus of claim 9 configured as a user equipment for a third generation partnership project (3GPP) universal terrestrial radio access (UTRA) system.

* * * * *